(12) United States Patent
Umeki

(10) Patent No.: US 11,640,001 B2
(45) Date of Patent: May 2, 2023

(54) LASER RADAR DEVICE, LASER RADAR SYSTEM AND RAIN DETECTION METHOD

(71) Applicant: DENSO WAVE INCORPORATED, Aichi-pref. (JP)

(72) Inventor: Shunsuke Umeki, Chita-gun (JP)

(73) Assignee: DENSO WAVE INCORPORATED, Aichi-Pref. (JP)

( * ) Notice: Subject to any disclaimer, the term of this patent is extended or adjusted under 35 U.S.C. 154(b) by 787 days.

(21) Appl. No.: 16/541,320

(22) Filed: Aug. 15, 2019

(65) Prior Publication Data

US 2020/0088885 A1 Mar. 19, 2020

(30) Foreign Application Priority Data

Sep. 18, 2018 (JP) .............................. JP2018-173690

(51) Int. Cl.
  *G01S 17/95* (2006.01)
  *G01S 7/481* (2006.01)
  *G01V 8/18* (2006.01)
  *G01V 8/14* (2006.01)
  *G01S 17/06* (2006.01)

(52) U.S. Cl.
  CPC ............ *G01S 17/95* (2013.01); *G01S 7/4817* (2013.01); *G01S 17/06* (2013.01); *G01V 8/14* (2013.01); *G01V 8/18* (2013.01)

(58) Field of Classification Search
  CPC .............................. G01S 17/95; G01S 7/4817
  See application file for complete search history.

(56) References Cited

U.S. PATENT DOCUMENTS

| 2011/0074955 A1* | 3/2011 | Kuehnle | G01W 1/14 382/104 |
| 2011/0128547 A1* | 6/2011 | Beppu | G01S 17/931 356/445 |
| 2019/0217864 A1* | 7/2019 | Kusukame | G01W 1/02 |

FOREIGN PATENT DOCUMENTS

JP 2015-052465 A 3/2015

* cited by examiner

*Primary Examiner* — Thanh Luu
(74) *Attorney, Agent, or Firm* — Harness, Dickey & Pierce, P.L.C.

(57) ABSTRACT

A laser radar device includes a laser radar optical system that emits laser light and receives reflected light of the laser light reflected from a reflector disposed outside the laser radar device. A controller determines that it is rainy weather when a measurement width of the reflector in a scanning direction of the laser light measured by use of the laser light and the reflected light is larger than a predetermined reference measurement width of the reflector.

9 Claims, 5 Drawing Sheets

LASER RADAR DEVICE, LASER RADAR SYSTEM AND RAIN DETECTION METHOD

CROSS REFERENCE TO RELATED APPLICATION

The present application claims the benefit of priority from Japanese Patent Application No, 2018-173690 filed on Sep. 18, 2018, The entire disclosure of the above application is incorporated herein by reference.

TECHNICAL FIELD

The present invention relates to a laser radar device, a laser radar system including the laser radar device, and a rain detection method using the laser radar device.

BACKGROUND

A laser radar device determines whether there is rainfall by using attenuation in level of reflected light caused by irradiating a reference structure (e.g. wall surface) with a laser light.

SUMMARY

A laser radar device includes a laser radar optical system that emits laser light and receives reflected light of the laser light reflected from a reflector disposed outside the laser radar device, and a controller that determines that it is rainy weather when a measurement width of the reflector in a scanning direction of the laser light measured by use of the laser light and the reflected light is larger than a predetermined reference measurement width of the reflector.

DETAILED DESCRIPTION

A laser radar device of a comparative example determines whether there is rainfall by using attenuation in level of reflected light caused by irradiating a reference structure (e.g. wall surface) with a laser light.
However, the level of the reflected light may be also attenuated due to dirt or flaws on the wall surface or an irradiation surface of the laser radar device, and therefore, the laser radar device may erroneously determines that there is rainfall. The present disclosure is to provide a technique for detecting rain more accurately.

Figure 1:
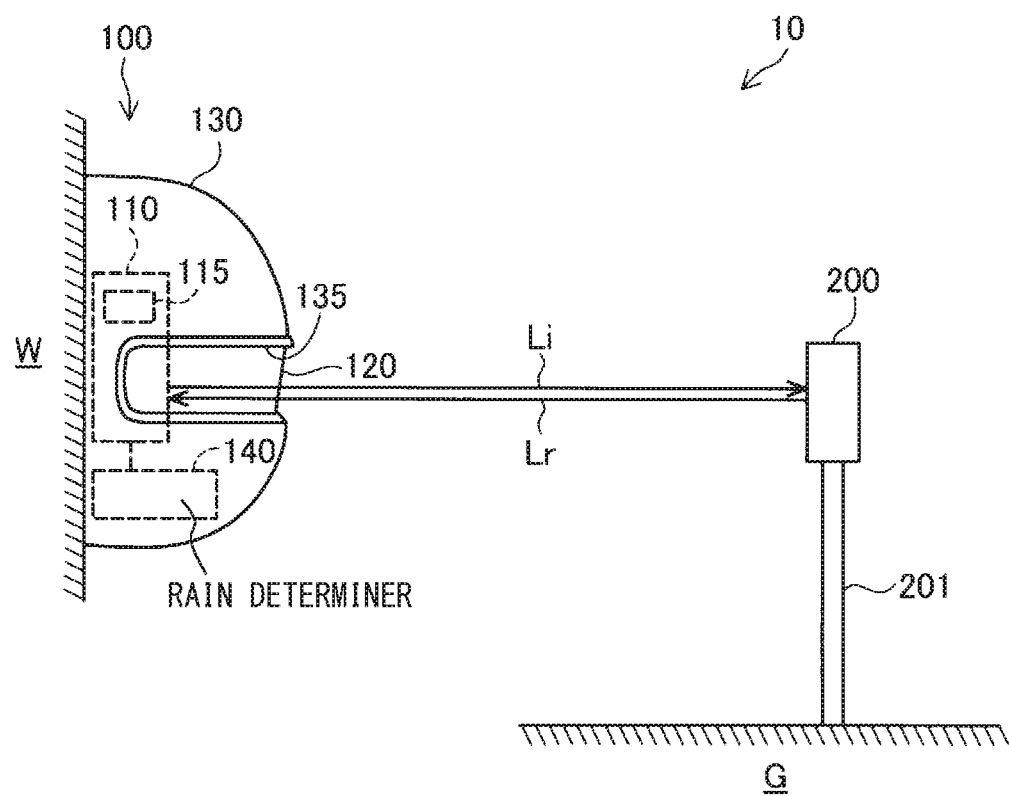
FIG. 1 is a schematic external view of a laser radar system according to an embodiment.

FIG. 1 is a schematic external view of a laser radar system 100 according to an embodiment of the present disclosure. The laser radar system 10 includes a laser radar device 100 and a reflector 200. The laser radar device 100 is installed outdoors. In the example of FIG. 1, the laser radar device 100 is disposed on a wall W. The reflector 200 is disposed on a ground G via a support rod 201, and the reflector 200 is placed within an irradiation range of the laser radar device 100.

The laser radar device 100 includes a laser radar optical system 110 and an optical system case 130 housing the laser radar optical system 110. The optical system case 130 has an opening 135, and a light transmission plate 120 is disposed in the opening 135. The light transmission plate 120 is made of, for example, a transparent resin plate. The laser radar optical system 110 includes a light emitter (not shown) including a laser diode for emitting a laser light Li, and a light receiver (not shown) including a photodiode for receiving a reflected light Lr of the laser light Li, and a control device 115 that controls the emission of laser light Li and measures a distance between the laser radar optical system 110 and a reflector that reflects the laser light Li. The control device 115 is configured by, for example, a microcomputer (e.g. microcontroller). For example, an infrared ray is used for the laser light Li. The "reflector" is an object capable of reflecting light.

The laser radar device 100 operates, for example, as follows in order to measure the distance to the external reflector. The light emitter of the laser radar optical system 110 intermittently emits the laser light Li in the horizontal direction by driving of a rotating unit (not shown). The interval (i.e. rotational angle resolution) at which the laser light Li is emitted is, for example, 0.25°. When the laser light Li reaches the external reflector through the light transmission plate 120, the laser light Li is reflected by the reflector. The light receiver of the laser radar optical system 110 receives the reflected light Lr reflected by the reflector through the light transmission plate 120. The control device 115 of the laser radar optical system 110 measures the distance to the reflector by using a time from emission of the laser light Li to receiving of the reflected light Lr. In addition, the control device 115 can measure a measurement width of the reflector by using the laser light Li, the reflected light Lr, and an emission angle of the laser light Li. This detailed description will be made later. The emission angle of the laser light Li can be detected by an angle encoder (not shown).

A rain determiner 140 is configured by, for example, a microcomputer (e.g. microcontroller). The rain determiner 140 uses the measurement width of the reflector measured by the control device 115 of the laser radar optical system 110 to determine whether an environment surrounding the laser radar system 10 is rainy weather. This detailed description will be made later. Although the rain determiner 140 and the control device 115 of the laser radar optical system 110 are divided for convenience of explanation, the rain determiner 140 may be incorporated in the control device 115.

The reflector 200 is a reflector formed of a retroreflecting material. The "retroreflective material" is a reflective material that reflects incident light in the direction opposite to the incident direction by multiple reflections of incident light or combination of multiple reflections and refractions. As the reflecting device 200 may employ, for example, a capsule lens reflecting material, an enclosed lens reflecting material, or an exposure lens reflecting material. The reflector 200 reflects the incident laser light Li almost 100% regardless of the irradiance.

Figure 2:
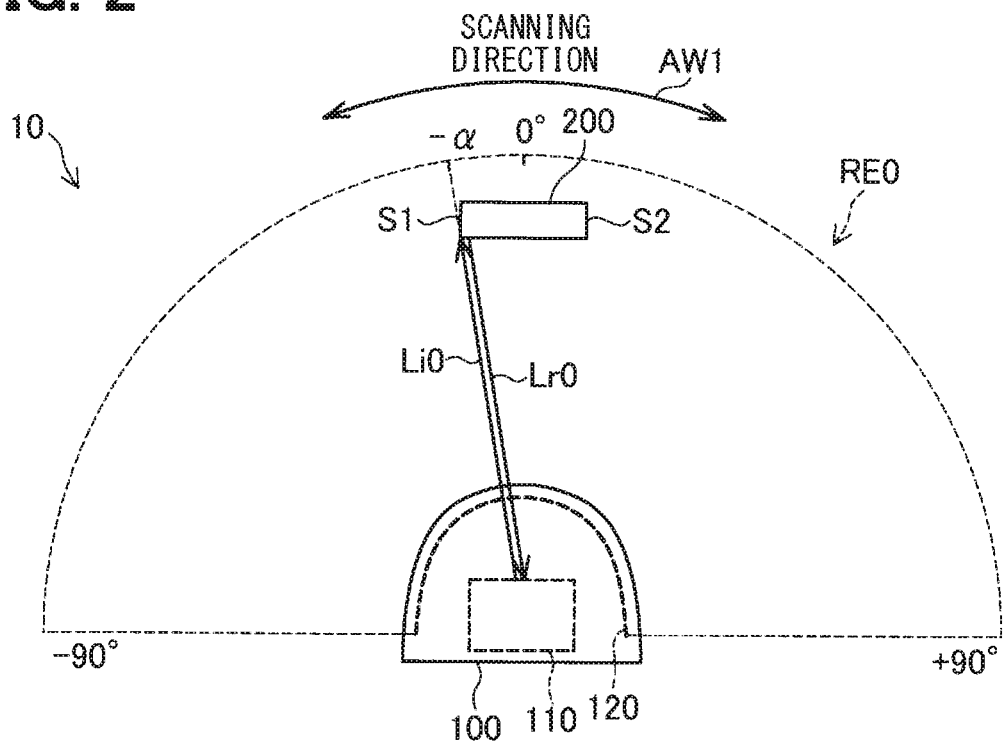
FIG. 2 is a top view of the laser radar system in fine weather.
Figure 3:
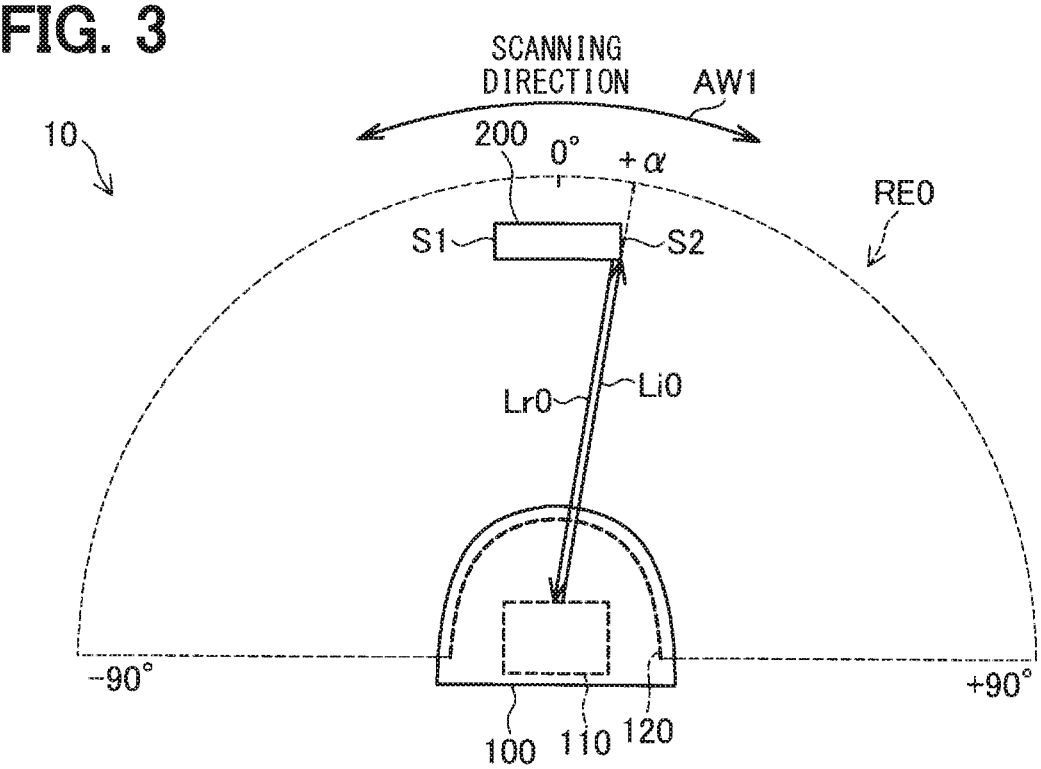
FIG. 3 is another top view of the laser radar system in fine weather.

FIG. 2 and FIG. 3 are top views of the laser radar system 10, and illustrate and explain a method of measuring the measurement width of the reflector 200. The rain determiner 140 is omitted in FIGS. 2 and 3 for convenience of illustration. The irradiation range RE0 of the laser radar device 100 is a semicircular range centered on the laser radar device 100, and is defined by the opening 135 of the laser radar device 100. For convenience of explanation, the emission angle of the laser light Li0 is 0° at the midpoint of the arc of the semicircle of the irradiation range RE0, and −90° and +90° at the end points of the arc, respectively. The reflector 200 is positioned so that the laser light Li0 at emission angle of 0° passes through the center of the reflector 200. In the examples of FIGS. 2 and 3, the environment surrounding the laser radar system 10 is fine weather.

Figure 4:
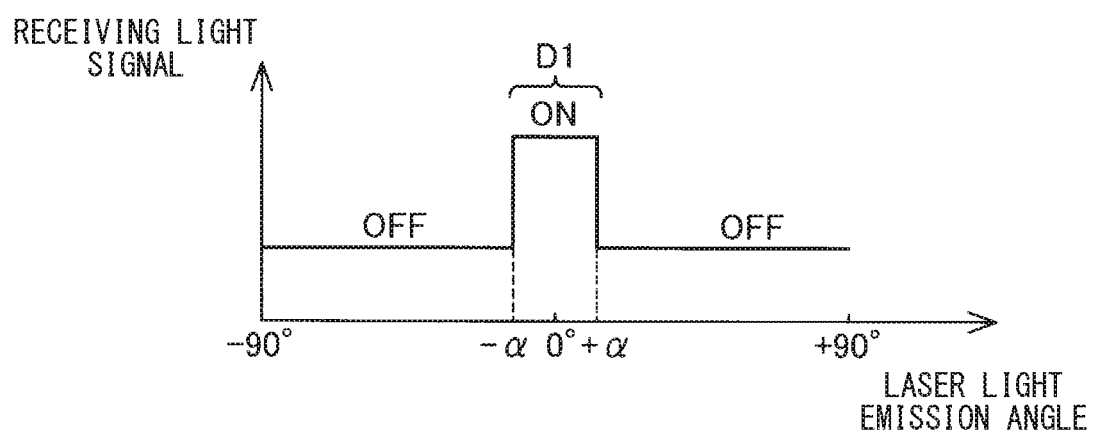
FIG. 4 is a view showing a relationship between a receiving light signal and a laser light emission angle in fine weather.

The laser radar optical system 110 of the laser radar device 100 intermittently emits the laser light Li0 in an emission range from −90° to +90°. A scanning direction of the laser light Li0 is the direction of the arrow AW1 in the drawings. When the laser light Li0 is reflected from the reflector 200, the reflected light Lr0 is incident on the laser radar optical system 110 in the opposite direction to the emission direction of the laser light Li0. Upon the incidence of the reflected light Lr0, the control device 115 of the laser radar optical system 110 acquires an emission angle of the laser light Li0 from the angle encoder, and generates a receiving light signal. For example, the laser light Li0 strikes and the reflected light Lr0 is reflected from between a first end S1 and a second end S2 of the reflector 200. When the reflected light Lr0 is incident on the laser radar optical system 110, the control device 115 acquires the angles −α to +α of the emitted laser light Li0 from the angle encoder and generates a receiving light signal as shown in FIG. 4. The receiving light signal is ON during incidence of the reflected light Lr0, and is OFF during no incidence of the reflected light Lr0.

FIG. 4 is a view showing a relationship between the receiving light signal and the emission angle of the laser light Li in the examples of FIGS. 2 and 3. As in the above descriptions of FIGS. 2 and 3, there is the incidence of the reflected light Lr0 when the emission angle of the laser light Li is between −α and +α. Therefore, the receiving light signal is ON between the angle −α and +α, and the receiving light signal is OFF between −90° and −α and between +α and +90°. The control device 115 of the laser radar optical system 110 calculates a measurement width D1 of the reflector 200 in the scanning direction AW1 of the laser light Li0 according to a predetermined calculation method by using a range of angles corresponding to the ON state of the receiving light signal, in this example, the sum 2α of the absolute values of the angles −α and +α. In the examples of FIGS. 2 and 3, the environment surrounding the laser radar system 10 is fine weather. Therefore, since there is almost no object that inhibits the laser light Li0 and the reflected light Lr0, the calculated measurement width D1 of the reflector 200 is substantially the same as the actual width of the reflector 200. Since the laser light Li0 may be diffused to some extent by dust or the like in the air from emission to arrival at the reflector 200, the measurement width D1 may be corrected by a predetermined correction calculation. The control device 115 may generate a two-dimensional map using a measurement distance in the range of −90° to +90° and the emission angle of the laser light Li0, and may calculate the measurement width D1 of the reflector 200 based on this two-dimensional map.

Figure 5:
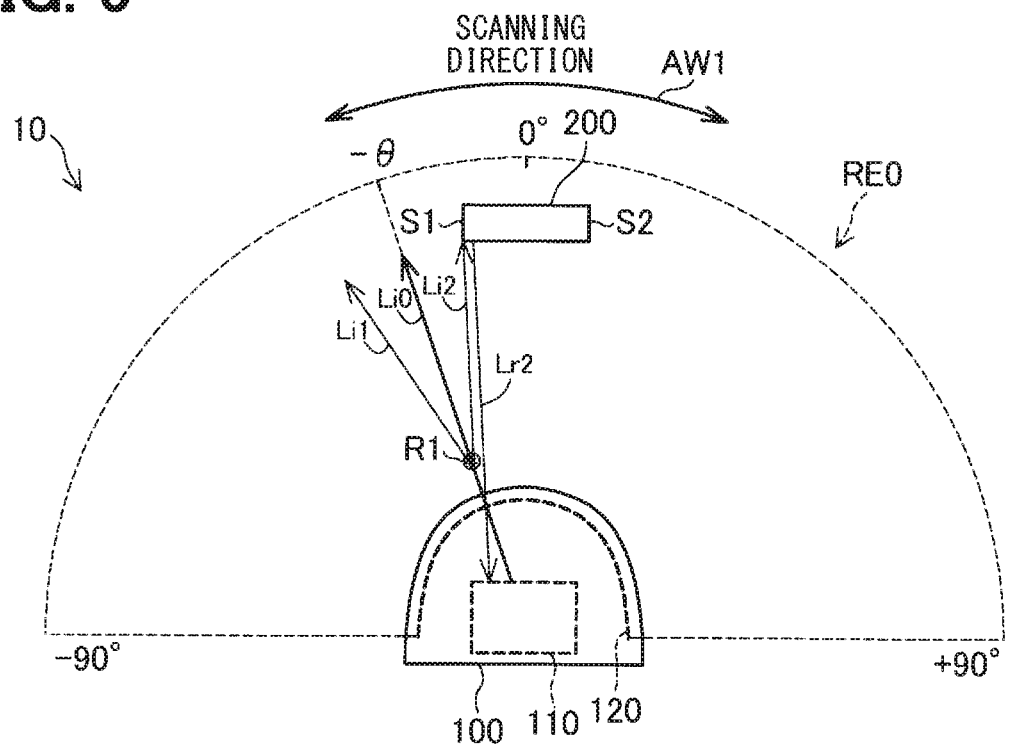
FIG. 5 is a top view of the laser radar system in rainy weather.
Figure 6:
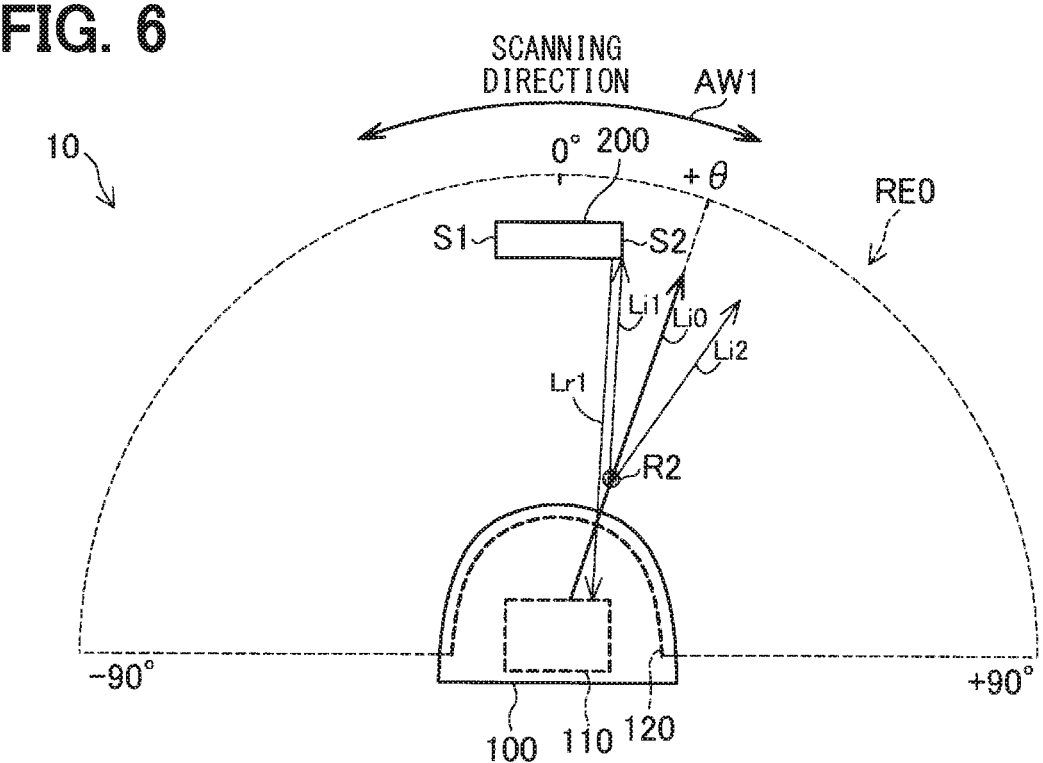
FIG. 6 is another top view of the laser radar system in rainy weather.
Figure 7:
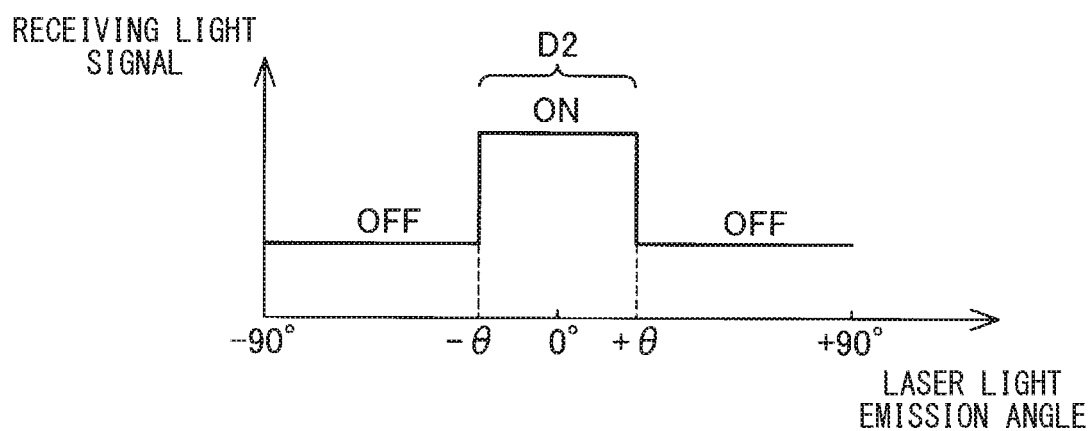
FIG. 7 is a view showing a relationship between a receiving light signal and a laser light emission angle in rainy weather.

FIGS. 5, 6 and 7 are diagrams corresponding to FIGS. 2, 3 and 4, and are explanatory diagrams in a case where the environment surrounding the laser radar system 10 is rainy weather. As shown in FIGS. 5 and 6, in the rainy weather, the laser light Li0 emitted from the laser radar optical system 110 strikes raindrops R1 and R2 before reaching the reflector 200. When the laser light Li0 strikes the raindrops R1 and R2, a part of the laser light Li0 is refracted to become a plurality of diffused lights Li1 and Li2. These diffused lights Li1 and Li2 hit surrounding objects and are reflected. In the example of FIG. 5, when the emission angle of the laser light Li0 is an angle −θ (θ>α), the diffused light Li2 caused by the strike of the laser light Li0 against the raindrop R1 is reflected by the first end S1 of the reflector 200, and the reflected light Lr2 is incident on the laser radar optical system 110. That is, the incidence of the reflected light Lr2 occurs before irradiation of the reflector 200 with the laser light Li0. On the other hand, in the example of FIG. 6, when the emission angle of the laser light Li0 is an angle +θ, the diffused light Li1 caused by the strike of the laser light Li0 against the raindrop R2 is reflected by the second end S2 of the reflector 200, and the reflected light Lr1 is incident on the laser radar optical system 110. That is, the incidence of the reflected light Lr1 occurs even after the irradiation of the reflector 200 with the laser light Li0. Upon the incidence of the reflected lights Lr1 and Lr2, the control device 115 of the laser radar optical system 110 acquires an emission angle −θ to +θ of the laser light Li0, and generates a receiving light signal as shown in FIG. 7.

In FIG. 7, the receiving light signal is ON between the angle −θ and +θ, and the receiving light signal is OFF between −90° and −θ and between +θ and +90°. Compared with FIG. 4, the angle range corresponding to the ON state of the receiving light signal, more specifically, the sum 2θ of the absolute values of the angles −θ and +θ in FIG. 7 is larger than the angle range 2α corresponding to the ON state of the receiving light signal in FIG. 4. As a result, a measurement width D2 of the reflector 200 in the scanning direction AW1 of the laser light Li0 calculated using the angle range 2θ by the control device 115 of the laser radar optical system 110 is larger than the measurement width D1 calculated in FIG. 4. That is, the measurement width D2 of the reflector 200 in the rainy weather is larger than the measurement width D1 of the reflector 200 in the fine weather. The rain determiner 140 determines whether it is rainy weather utilizing such phenomenon.

Figure 8:
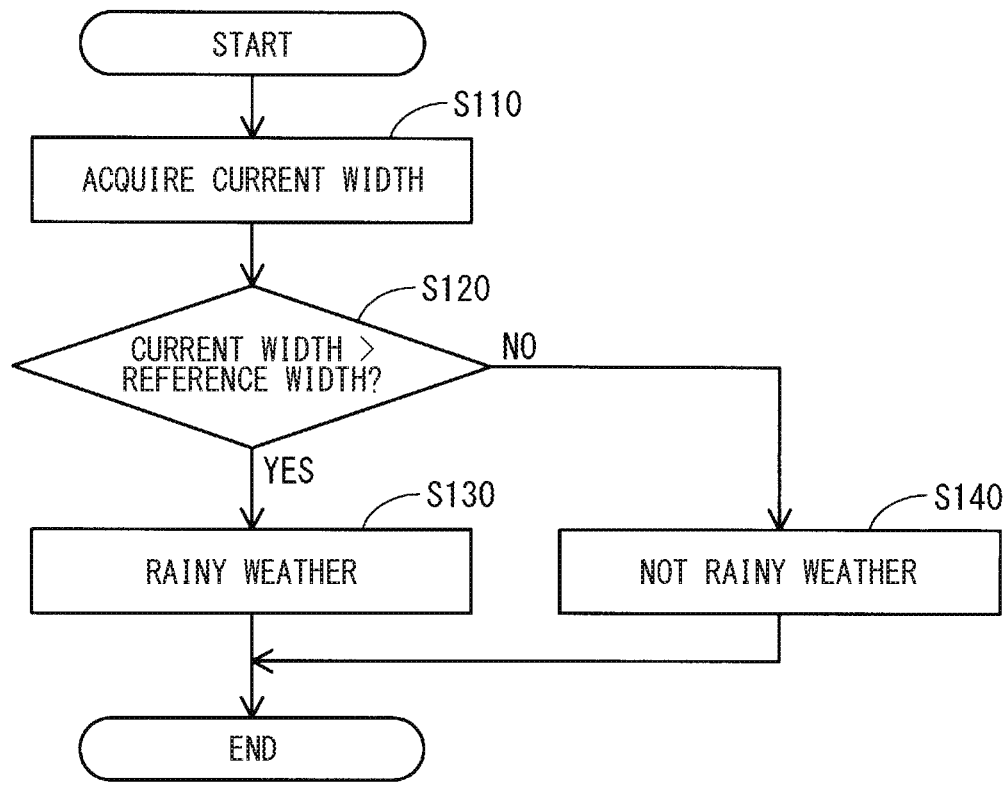
FIG. 8 is a flowchart illustrating a rainy weather determination process.

FIG. 8 is a flowchart illustrating a rainy weather determination process performed by the rain determiner 140. The rainy weather determination process is repeatedly performed during the distance measurement of the laser radar device 100, For convenience of explanation, the flowchart of the rainy determination process will be extracted and described. The rain determiner 140 stores, for example, the measurement width D1 of the reflector 200 in fine weather as a predetermined reference measurement width.

At step S110, when the laser radar optical system 110 emits the laser light Li0 and receives the reflected light Lr0 (Lr1, Lr2), the rain determiner 140 constantly acquires a current measurement width of the reflector 200 from the control device 115 of the laser radar optical system 110. At step S120, the rain determiner 140 compares the current measurement width of the reflector 200 with the measurement width D1 as a reference. When the current measurement width of the reflector 200 is larger than the reference measurement width D1 (S120: Yes), the rain determiner 140 proceeds to step S130 and determines that it is rainy weather. When the rain determiner 140 determines that it is rainy weather, the rain determiner 140 may perform processing for reducing the influence of rain, for example, performing correction on the measurement width of the monitored object within the irradiation range. After this, the rain determiner 140 terminates the rainy weather determination process. When the current measurement width of the reflector 200 is smaller than or equal to the reference measurement width D1 (S120: No), the rain determiner 140 proceeds to step S140, determines that it is not rainy weather, and terminates the rainy weather determination process, Step S140 may be omitted. Instead of using the measurement width D1 of the reflector 200 in the fine weather as the reference measurement width, an appropriate measurement width which has been obtained from experiences or experiments may be used as the reference measurement value in order to determine whether it is rainy weather.

As described above, in the embodiment, the rain determiner 140 determines that it is rainy weather when the measurement width of the reflector 200 in the scanning direction AW1 of the laser light Li0 measured using the laser light Li0 and its reflected light Lr0 (Lr1, Lr2) is larger than the predetermined reference measurement width D1 of the reflector 200. If it is determined whether it is rainy weather by attenuation of reflected light of laser light, the determination result may be influenced by the irradiation surface of the laser radar device 100 or the condition of the reference structure. The inventor of the present disclosure focuses on the phenomenon that the laser light Li0 is refracted and diffused when it hits the raindrops R1 and R2 because the measurement width of the reflector 200 is usually larger in a rainy weather environment. According to the present embodiment, since the rain determiner 140 determines whether it is rainy weather by using the measurement width of the reflector 200, the influence of the irradiation surface of the laser radar device 100 or the condition of the reference structure can be reduced, and rain can be detected more accurately.

The reflecting device 200 may employ another reflector instead of the reflector formed of the retroreflecting material. When the reflector formed of the retroreflecting material is used, the reflected lights Lr1 and Lr2 of the diffused lights Lit and Lit which are lower in irradiance than the laser light Li0 can be reliably generated. The measurement width of the reflector 200 can be more easily measured in rainy weather.

The present invention should not be limited to the embodiment described above, and various other embodiments may be implemented without departing from the scope of the present disclosure. For example, the technical features in the embodiment can replaced or combined as appropriate. Also, if the technical features are not described as essential in the present specification, they can be deleted as appropriate.

While the present disclosure has been described with reference to various exemplary embodiments thereof, it is to be understood that the disclosure is not limited to the disclosed embodiments and constructions. To the contrary, the disclosure is intended to cover various modifications and equivalent arrangements. In addition, while the various elements of the disclosure are shown in various combinations and configurations, which are exemplary, other various combinations and configurations, including more, less or only a single element, are also within the spirit of the disclosure.

What is claimed is:

1. A laser radar device comprising:
a laser radar optical system configured to emit laser light and receive reflected light of the laser light reflected from a reflector disposed outside the laser radar device; and
a controller configured to
store a predetermined reference measurement width of the reflector,
acquire a measurement width of the reflector in a scanning direction of the laser light measured by use of the laser light and the reflected light,
compare the predetermined reference measurement width with the acquired measurement width of the reflector, and
determine that it is rainy weather when the acquired measurement width of the reflector is larger than the predetermined reference measurement width of the reflector.

2. The laser radar device according to claim 1, wherein
the laser radar optical system scans the laser light at a predetermined rotational angle resolution, and
the controller measures the acquired measurement width based on an emission angle of the laser light and the reflected light.

3. The laser radar device according to claim 1, wherein
the predetermined reference measurement width is a measurement width of the reflector which has been measured in fine weather in advance.

4. A laser radar system comprising:
the laser radar device according to claim 1; and
the reflector formed of a retroreflecting material.

5. The laser radar device according to claim 1, wherein
the laser radar optical system includes:
a light emitter configured to emit the laser light at regular intervals and rotate to scan the reflector with the laser light in the scanning direction; and
a light receiver configured to receive the reflected light.

6. The laser radar device according to claim 5, wherein
the controller is configured to:
generate an ON signal when the light receiver receives an incidence of the reflected light, and an OFF signal when the light receiver receives no incidence of the reflected light; and
calculate the acquired measurement width of the reflector based on a range of the ON signal in the scanning direction.

7. A method for detecting rain, comprising:
storing a predetermined reference measurement width of the reflector;
emitting a laser light to a reflector formed of a retroreflecting material;
acquiring a measurement width of the reflector in a scanning direction of the laser light by use of the laser light and a reflection light of the laser light reflected from the reflector; and
comparing the predetermined reference measurement width with the acquired measurement width of the reflector, and
determining that it is rainy weather when the acquired measurement width is larger than the predetermined reference measurement width of the reflector.

8. The method according to the claim 7, wherein
the emitting of the laser light includes:
emitting the laser light at regular intervals; and
scanning the reflector with the laser light by rotating a light emitter in the scanning direction.

9. The method according to the claim 8, wherein the acquiring of the measurement width includes:
   generating an ON signal when receiving an incidence of the reflection light, and an OFF signal when receiving no incidence of the reflection light; and
   calculating the acquired measurement width of the reflector based on a range of the ON signal in the scanning direction.

* * * * *